United States Patent [19]

Emley

[11] 3,711,937

[45] Jan. 23, 1973

[54] METHOD OF ROLL BONDING TO FORM A TITANIUM CLAD ALUMINUM COMPOSITE

[75] Inventor: Frank Emley, Easton, Pa.

[73] Assignee: Pfizer, Inc., New York, N.Y.

[22] Filed: July 21, 1971

[21] Appl. No.: 164,813

[52] U.S. Cl. ..................29/487, 29/497, 29/497.5
[51] Int. Cl. ................................................B23k 31/02
[58] Field of Search.....29/197, 487, 497.5, 504, 488, 29/497

[56] References Cited

UNITED STATES PATENTS

| | | | |
|---|---|---|---|
| 2,908,073 | 10/1959 | Dulin | 29/497.5 X |
| 3,165,829 | 1/1965 | Wardlaw | 29/497.5 X |
| 3,359,142 | 12/1967 | Ward, Jr. | 29/197 X |
| 3,381,366 | 5/1968 | Winter | 29/497.5 X |
| 3,397,045 | 8/1968 | Winter | 29/197 UX |
| 3,462,826 | 8/1969 | Winter | 29/197 X |

*Primary Examiner*—J. Spencer Overholser
*Assistant Examiner*—Ronald J. Shore
*Attorney*—Arthur G. Connolly et al.

[57] ABSTRACT

The process of cladding a sheet of aluminum or an alloy thereof with a sheet of titanium or an alloy thereof which comprises the steps of cleaning and removing oxide and other impurities and foreign matter from the surface of the aluminum and titanium sheets to be bonded, pre-heating said aluminum and titanium sheets together at a temperature of from about 500° to 1000°F., bringing the cleaned surfaces into momentary contact under a pressure sufficient to unite the surfaces and to effect a reduction (preferably in one or two passes) of from about 3–50 percent in a resultant composite sheet and post-heating the composite which is formed at a temperature of from about 500° to 1150°F.

7 Claims, No Drawings

METHOD OF ROLL BONDING TO FORM A TITANIUM CLAD ALUMINUM COMPOSITE

BACKGROUND OF THE INVENTION

This invention relates to the general field of metal cladding. In particular, it relates to a process for producing titanium clad aluminum.

The use of clad, or composite, metals as materials of construction has become, in recent years, a well-established practice. Such clad materials consist of a base metal, usually relatively inexpensive, to the surface of which is bonded or clad a layer of a second metal which possesses certain desirable properties, e.g., high corrosion or oxidation resistance, not characteristic of the base metal. In most instances, the metal which forms the cladding layer is considerably more costly than is the base metal to which it is applied. Hence a considerable economic saving is made possible by the use of a thin layer rather than a thick layer of the costly metal. In other cases, the surface characteristics of the base metal are not adequate even though many of its other characteristics such as light weight, good electrical conductivity, etc. may be highly desirable for the application. In such an instance, it is common to clad the base metal with a metal whose surface is more amenable to the particular application where it may provide corrosion resistance, abrasion resistance, etc.

Another advantageous feature of the use of clad metals results from the fact that frequently the metal possessing the desired corrosion resistance or other property is lacking in the necessary tensile strength, thermal properties, or compression strength to enable it to be employed per se in applications where stress will be encountered. Thus, in addition to the economy provided by the use of the less expensive metal, the structural strength and rigidity which it may impart to the composite system represent an important and valuable factor in composite assemblies.

The particular combination of titanium and aluminum will reduce the overall material cost in this assembly versus using straight titanium. It will maintain the strength and corrosion resistance of titanium while improving electrical and thermal conductivity and lowering the overall weight.

A variety of methods exist for bonding one metal to the surface of another to form a composite multilayered assembly; however, each of these methods suffers from certain disadvantages when titanium clad aluminum is desired. U.S. Pat. No. 3,233,312 makes use of the explosive process for this combination, while U.S. Pat. No. 3,173,202 describes the use of a flame spraying technique. The need for a safe, simple, economical and effective process for titanium clad aluminum will be apparent.

SUMMARY OF THE INVENTION

The present invention comprises a process for the titanium cladding of aluminum by the following four step process: (1) removing the oxide and all foreign matter from the surface of the aluminum and the titanium sheets to be bonded; (2) pre-heating the two metals to a temperature of from about 500° to 1000°F.; (3) bringing the cleaned surfaces of both metals into contact under pressure so that they are reduced by from about 3–50 percent; and (4) post-heating the resulting composite sheet at a temperature of from about 500° to 1150°F. In the case of the pre-heating temperature, a temperature of from about 600° to 850°F. is especially preferred, and the treatment will sometimes be carried out under compression. The preferred reduction is from about 7–15 percent being taken in two passes with only 0.5 to 2 percent reduction being accomplished in the first pass and the remainder of the reduction being accomplished in the second pass. It is necessary that these two passes follow quickly one upon another in order that the temperature of the panels being rolled does not drop below a desirable level. If these reductions cannot follow within a few seconds of each other, then it is desirable to reheat the panel between reductions to return to within about 100° of the original pre-heat temperature before proceeding with the second reduction. The accomplishment of the desired amount of reduction in the rolling step can be done in either one pass or in more than two passes with good results. For the post-heating step, a temperature of form about 800° to 1000°F. is preferred.

The removal of the oxide from the surface of the sheet of aluminum is preferably accomplished by wire brushing, abrading, chemical cleaning or etching, or abrasive belt grinding. Other methods of cleaning may also be used. Cleaning of the titanium surface may be similarly accomplished by abrading with wire brush, abrasive belt grinding, or by chemical etching with appropriate acid mixtures. Abrading is generally preferred as being cheaper and quite effective in achieving the desired results.

DETAILED DESCRIPTION OF THE INVENTION

The process of this invention produces a composite consisting of an aluminum sheet of variable thickness clad on one or both sides with titanium. Titanium is purchased with either an "as rolled" or chemically etched finish in an annealed or hardened (work or precipitation) condition and in all cases is abraded as described above. Normally during processing, such metal sheets will be coated with surface oils and films of varying nature as well as oxides. It is necessary that these sheets and oxides be removed, either by the supplier of the sheet or by the person practicing this invention. The step of abrading the surfaces is preferably done with an 80 grit coated paper or cloth type belt with a machine appropriate for the operation. Other grit sizes, however, either smaller or larger, can be used successfully and are not excluded. The aluminum portion of the composite can be either 1100 "O" temper aluminum or any other alloy in either an "H" (work hardened) or "T" (tempered) condition. Although many of the low alloy aluminum systems do not require cladding with pure aluminum prior to bonding, highly alloyed materials which form volatile non-adherent oxides such as zinc oxide or brittle refractory oxides such as magnesium oxide or silicon dioxide are usually isolated from the surfaces to be bonded by pre-cladding the aluminum alloy with a high purity aluminum, usually 1145 grade aluminum. This operation of pre-cladding aluminum alloys with a cladding thickness of 5–10 percent of that of the overall thickness of the aluminum sheet with a high purity aluminum is usually done by the aluminum supplier.

The reason for this use of high purity aluminum on the surface of aluminum alloys is that some elements such as magnesium and silicon and zinc form oxides on the surface of an aluminum alloy which contains them which oxides are deleterious to bonding.

The prepared surfaces are placed in contact before pre-heating. When the pre-heat step is rather long and conducted at a relatively high temperature within the temperature range specified, it may be desirable to minimize contact of the ambient atmosphere (usually air) with the surfaces to be bonded to minimize growth of oxide or nitride impurity layers. When properly prepared, the composite is pre-heated to a temperature of from 500° to 1000°F. The heated metals are then compressed together so that a reduction of from 3 to 50 percent occurs. The preferred method for bringing this reduction about is in a rolling mill.

A double rolling pass is preferred to accomplish the desired reduction with the first pass being a very light pinch pass of 0.5–2 percent. It should be stated, however, that good bonding can be achieved by our method using either one pass or more than two passes and that this is not a limiting part of the invention.

After rolling, the material is post-heated at a temperature of from about 500° to 1150°F. A preferred temperature and time cycle is for post-heating between 800° and 1000°F. for a period of 0.1 to 1.0 hour. The resultant bond strength is measured using a peel test. Peel strengths in excess of 100 lbs./in. are produced.

The composite metal produced by use of the process of this invention find their major application in electrochemical processing, as heat exchangers and boilers, as cryogenic containers and in structural applications in the aircraft and aerospace industries. The process of this invention has the advantages of requiring no special or unusual equipment or precautions, so that it is economical, and furthermore, it produces a composite of great strength.

The following examples serve to illustrate this invention and in no way limit the scope of the appended claims.

EXAMPLE I

A successful cladding of 0.125 inch gage 1100–TO aluminum with 0.016 inch gage titanium (50A) was performed by the following method. The aluminum was first abraded on an 80 grit belt sander to an average surface roughness of 200–320 $\mu$ in. The titanium was similarly abraded and then was placed in contact with the prepared surface of aluminum and the two metals were spot welded at the sides and the leading edge. The composite was then heated to a temperature of 680°–750°F. and then warm rolled at 680°F. to a reduction of 10 percent. The composite was then post heated at 1000°F. for 30 minutes. This treatment provided an excellent bond having a peel strength of 165–218 lb/in.

EXAMPLE II

Following the procedure of Example I, 0.045 inch gage titanium was bonded to 0.250 inch gage aluminum. The post heating time was increased to 1–2 hours. Peel strengths ranged from 160–200 lb/in.

EXAMPLE III

Annealed titanium 6A14V, 0.040 inch gage, was bonded to 0.125 inch gage aluminum by the procedure of Example I, but the post heating treatment was 1100°F. for 1–2 hours. Peel strength was in excess of 300 lb/in.

EXAMPLE IV

The clad metal products shown below were produced by the foregoing procedures.

| Composite Produced | 0.016"Ti(50A-G2)-0.125"AL(1100)-0.016"Ti(50A-G2) | 0.020"Ti(35A-G1)-0.125"AL(1100)-0.020"Ti(35A-G1) |
|---|---|---|
| Titanium to Aluminum Ratio | 0.204 | 0.242 |
| Ultimate Tensile Strength (PSI) | 30,400(L)* | 23,800(L) |
| Yield Strength 2% Offset (PSI) | 21,500(L) | 15,300(L) |
| Elongation in 2 inches (%) | 30(L) | 39(L) |
| Ratios of Tensile to Yield Strength | 1.41 | 1.55 |
| Density in lb/ft³ | 192 | 195 |
| Tensile Strength to Weight Ratio (PSI/lb) — Ft³ | 158 | 122 |
| Thermal Conduct. btu/ft²/Ft/HR/OF at 68°F. | 106 | 102 |
| Electrical Resistivity Micro hm-cm at 68° F. | 13.7 through thickness 3.60 parallel to surface | 15.8 through thickness 3.76 parallel to surface |
| Minimum Satisfactory Bend Radius | 2T 180° | 1T 180° |

*L = Longitudinal Sample

| Composite Produced | 0.016"Ti (50A-G2) -0.250"AL (1100) -0.016" (50A-G2) | 0.063"Ti (50A-G2) -0.250"AL (1100)- 0.063"Ti (50A-G2) | 0.040"Ti 6AL4V -0.125"AL (1100) -0.040"Ti 6AL4V |
|---|---|---|---|
| Titanium to Aluminum Ratio | 0.114 | 0.335 | 0.391 |
| Ultimate Tensile Strength (PSI) | 20,500(L) | 38,600(L) | 78,500(L) |
| Yield Strength 2% Offset (PSI) | 13,000(L) | 25,000(L) | 73,300(L) |
| Elongation in 2 inches (%) | 31(L) | 37(L) | 19(L) |
| Ratios of Tensile to Yield Strength | 1.58 | 1.54 | 1.07 |
| Density in lb/ft³ | 183 | 207 | 211 |
| Tensile Strength to Weight Ratio (PSI/lb) —Ft³ | 112 | 187 | 372 |
| Thermal Conduct. btu/ft²/ft/hr/of | 118 | 91 | 82 |
| Electrical Resistivity Micro hm-cm at 68°F. | 9.1 through thickness 3.14 parallel to surface | 20.7 through thickness 4.25 parallel to surface | 68.7 through thickness 4.72 parallel to surface |
| Minimum Satisfactory Bend Radius | 1T cracked at 85° | 1T cracked at 115° | 1/2T cracked at 65° |

EXAMPLE V

Panels of 0.020 inch annealed titanium metal and 0.125 inch grade 1100 aluminum were prepared by abrading surfaces to be bonded with an 80 grit belt.

The panels were heated for 6 ½ minutes in an air circulating furnace held at 800°F. reaching a temperature of about 700°F. in that time. They were then bonded to clad the aluminum on both sides with a layer of titanium by rolling a total of approximately 10 percent reduction in thickness in two passes through the mill.

The first pass was limited to a thickness reduction of about 1 ½ percent. After bonding, panels were post-heated for the following times and temperatures with the resultant bond strengths being measured.

| Post-heat Treatment | | Bond Strength, |
|---|---|---|
| Time (Min.) | Temperature (°F.) | (lbs/in. of width) |
| 10 | 800 | 80 |
| 20 | 800 | 95 |
| 60 | 800 | 110 |
| 10 | 900 | 110 |
| 20 | 900 | 165 |
| 60 | 900 | 185 |
| 60 | 1,000 | 205 |

What is claimed is:

1. The process of cladding a sheet of aluminum or an alloy thereof on at least one side with a sheet of titanium or an alloy thereof, which process comprises the steps of cleaning and removing oxide from the surfaces to be bonded, pre-heating said aluminum sheet and said titanium sheet to a temperature of from about 500° to 1000°F., bringing the cleaned surfaces into momentary contact under a rolling pressure sufficient to unite the surfaces and to effect a reduction of the resultant composite sheet amounting to about 3 to 50 percent and post-heating said composite sheet at a temperature of from about 500° to 1150°F. to develop the bond.

2. The process of claim 1 wherein said pre-heating is carried out at from about 600° to 850°F.

3. The process of claim 1 wherein said reduction amounts to from about 7 to 15 percent.

4. The process of claim 1 wherein said post-heating is carried out at from about 800° to 1000°F.

5. The process of claim 1 wherein said oxide removal is performed by treatment with an abrasive belt sander using a grit size of from about 80–190.

6. The process of claim 1 wherein said reduction is achieved in two or more rolling steps.

7. The process of claim 6 wherein the reduction achieved in the first rolling step is from 0.5 to 2 percent.

* * * * *